United States Patent [19]
Potz et al.

[11] Patent Number: 5,482,018
[45] Date of Patent: Jan. 9, 1996

[54] INJECTION NOZZLE FOR INTERNAL COMBUSTION ENGINES

[75] Inventors: Detlev Potz, Stuttgart; Theodor Duetsch, Bamberg; Guenter Lewentz, Hemmingen; Uwe Gordon, Markgroeningen, all of Germany

[73] Assignee: Robert Bosch GmbH, Stuttgart, Germany

[21] Appl. No.: 351,393

[22] PCT Filed: May 21, 1993

[86] PCT No.: PCT/DE93/00446

§ 371 Date: Dec. 12, 1994

§ 102(e) Date: Dec. 12, 1994

[87] PCT Pub. No.: WO93/25813

PCT Pub. Date: Dec. 23, 1993

[30] Foreign Application Priority Data

Jun. 10, 1992 [DE] Germany ............... 42 18 980.2
Aug. 26, 1992 [DE] Germany ............... 42 28 360.4

[51] Int. Cl.⁶ ............................................. F02M 61/08
[52] U.S. Cl. ................ 123/305; 239/584; 239/533.2; 239/533.12
[58] Field of Search ................. 123/305, 467, 123/472; 239/583, 584, 585.4, 585.5, 533.2, 533.3, 533.12, 537

[56] References Cited

U.S. PATENT DOCUMENTS

| | | | |
|---|---|---|---|
| 3,249,308 | 5/1966 | Cadiou | 239/584 |
| 3,801,021 | 4/1974 | Jakob | 239/584 |
| 4,181,144 | 1/1980 | Landen | 239/533.2 |
| 5,127,584 | 7/1992 | Sczomak | 234/584 |
| 5,282,577 | 2/1994 | Neitz | 239/533.12 |

FOREIGN PATENT DOCUMENTS

WO91609 8/1991 WIPO.

*Primary Examiner*—Thomas N. Moulis
*Attorney, Agent, or Firm*—Edwin E. Greigg; Ronald E. Greigg

[57] ABSTRACT

A fuel injection nozzle for internal combustion engines with direct injection including a nozzle body and an outward-opening valve needle with a closing head, in which outward-oriented injection ports are disposed. In order to form exact oriented fuel streams from the injection onset on, the cross section of the stream is controlled by the valve needle as a function of its stroke. The injection ports have a sharp control edge with a sharp control edge on the nozzle body which determines the injection cross section, and a sealing seat line formed by a hollow frustoconical valve seat on the nozzle body and a frustoconical valve cone on the nozzle needle, with a radially inner annular edge. The annular edge is disposed on an annular body secured to the valve needle and is aligned with the control edge of the injection ports in the injection direction of the injection ports. The annular body is secured to the end of the nozzle needle toward the combustion chamber either nonpositively or positively.

16 Claims, 2 Drawing Sheets

INJECTION NOZZLE FOR INTERNAL COMBUSTION ENGINES

BACKGROUND OF THE INVENTION

The invention relates to a fuel injection nozzle for internal combustion engines, in particular those with direct injection, as generically defined hereinafter. In an injection nozzle of this type, known from European Patent Disclosure EP-A-209 244, the sealing seat, formed by the valve seat and the valve cone and having a circular linear form, is formed on the radially outer circumference of the valve seat or valve cone in that the cone angle of the valve seat on the nozzle body is smaller than the cone angle of the valve cone at the closing head of the valve needle. Moreover, the control edge at the transition from the valve seat to the guide portion of the nozzle body is rounded. This embodiment forms an annular gap of wedge-shaped cross section between the face of the valve seat and the valve cone and the circumference of the guide portion of the valve needle; in this annular gap, fuel collects aligned with the opening cross section of the injection ports of the valve needle when the valve is closed; especially at the injection onset, this collected fuel hinders stream preparation. Moreover, the fuel streams emerging from the injection ports sometimes strike the rounded portion and the faces tapering outward of the valve seat and valve cone, leading to an energy loss for fuel preparation.

A similar fuel injection nozzle is disclosed by U.S. Pat. No. 2,035,203; in it, the valve needle has a shaft with the closing head and sleeve surrounding the shaft that covers the longitudinal grooves in the shaft and that has slits in its face end oriented toward the valve that form injection ports of a defined cross section. In this known injection nozzle, although good stream preparation is attained, the tightness of its valve leaves something to be desired, because of the flat seat between the valve cone and the valve seat. This disadvantage is made even worse by the fact that the valve needle with the valve cone and the sleeve mounted is guided in the nozzle body, and so the tight seat fit is displaced by an offset of the axes of these components.

ADVANTAGES OF THE INVENTION

The injection nozzle according to the invention has an advantage that the injection streams are prepared with very low energy loss, and that because of the sharp control edge on the nozzle body, the instant that the nozzle cross section opens at the onset of the needle stroke is unequivocally defined. Moreover, because of the sealing seat diameter immediately radially adjoining the control edge, the diameter of the sealing seat is virtually identical to the hydraulically effective diameter of the piston slide of the valve needle in the nozzle body. As a result, it is possible to minimize the influence of counterpressure. Since the counterpressure on the side toward the combustion chamber acts upon the entire surface area resulting from the sealing seat diameter, but the hydraulic opening force acts only on the annular face between the upper needle guide and the diameter of the guide portion or of the piston slide of the valve needle, it is also advantageous, for satisfactory opening of the valve needle even at maximum combustion chamber pressure, that the hydraulically effective slide diameter is as great as possible, or in other words is as close as possible to the valve seat diameter.

Advantageous further features of and improvements to the fuel injection nozzle are possible with the provisions set forth herein. Embodying the valve needle of the injection nozzle so that the valve cone (17) is formed on an annular body (60) and secured to the closing head (16) of the valve needle (15) makes for a valve in which it is structurally simple to disposed the linear sealing seat in the immediate vicinity of the control edge of the valve body.

Exemplary embodiments of the invention are shown in the drawing and described in further detail below. FIG. 1 is a longitudinal section of a fuel injection nozzle; FIGS. 2–5 show different exemplary embodiments of the end toward the combustion chamber of the injection nozzle of FIG. 1, in section and on a larger scale; and FIG. 6 shows a detail A of the valve region of the injection nozzle of FIG. 1, on a highly enlarged scale.

DESCRIPTION OF THE PREFERRED EMBODIMENTS

Figure 1:
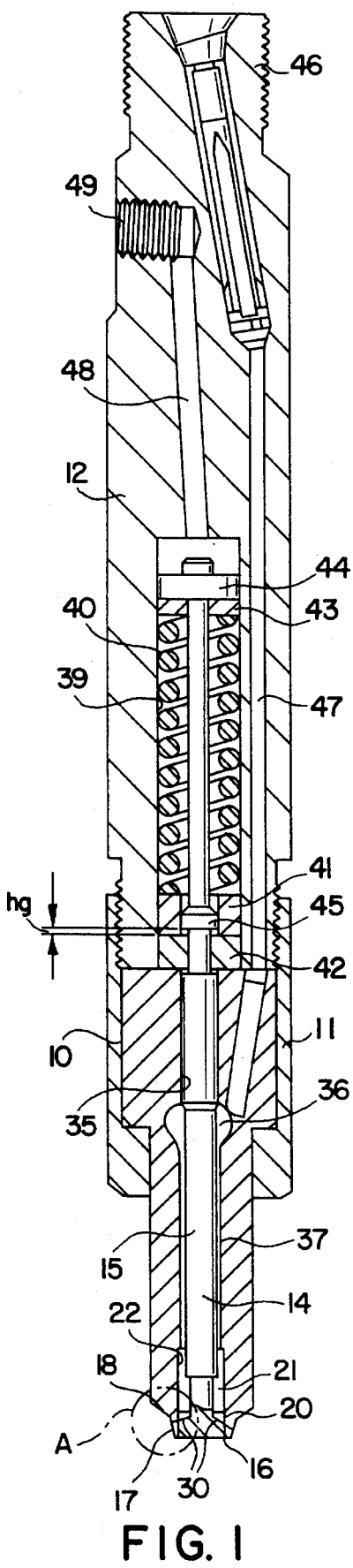

The injection nozzle has a nozzle body 10, which is firmly fastened to a nozzle holder 12 by means of a union nut 11. A valve needle 15, which on its end toward the combustion chamber has a closing head 16, is displaceably supported in the nozzle body 10. The closing head has a frustoconical valve cone 17 that cooperates with a hollow frustoconical valve seat 18 on the nozzle body 10. Radially offset from the valve cone 17, the closing head 16 has a piston slide 20, which is guided in the nozzle body 10 in a guide part 23, near the valve seat 18, of a cylinder bore (22) that forms a pressure chamber (21).

On its face end toward the pressure chamber 21, the piston slide 20 has an annular recess 25, embodied as an undercut, surrounding the shaft 14 of the valve needle 15 and limited radially on the outside by a jacket 26 of the piston slide 20. The outer wall face 27, limited by the jacket 26, of the recess 25 is conical so that the recess 25 opens wide toward the pressure chamber 21. A plurality of injection ports 30 are located in the jacket 26 of the piston slide 20, distributed over its circumference, and they define the injection cross sections. Instead of the holes, slits may also be provided. The injection holes or ports 30 may have a cylindrical cross section; preferably, they have a cross section that is elongated parallel to the center axis of the valve needle 15, for example the cross section of a flat oval or of a rectangle. Depending on the desired course of the opening cross section, any closed curve course can be achieved. The cross section may be designed to be narrower at the bottom near the valve cone 17 than above it. If the openings are embodied as slits or grooves, then to form a certain cross-sectional characteristic of the injection streams as a function of the stroke of the valve needle 15, they may have a rectangular, triangular, stepped, or other cross section adapted to the injection characteristic.

The valve needle 15 is displacably supported in a guide bore 35 in the nozzle body 10; this bore 35 is adjoined downstream by a collecting chamber 36 and an annular gap 37 that connects this chamber to the pressure chamber 21. The valve needle 15 is pulled with its closing head 16 toward the valve seat 18 on the nozzle body 10 by a closing spring 40, which is disposed in a spring chamber 39 in the nozzle holder 12. The closing spring 40 is supported on the nozzle body 10 via a spacer bush 41 and a slotted stop disk 42, and via a compensation disk 43 it presses against a support ring 44 secured to the end of the valve needle 15. To limit the total stroke $h_g$ of the valve needle 15, the shaft 14 of the valve needle 15 is offset at the level of the stop disk 42, forming a stop collar 45, which is spaced apart by the distance $h_g$ from the stop disk 42 in the closing position of the valve needle. An inflow conduit 47 that begins at a connection neck 46 in the nozzle holder 12 and in the nozzle body 10 leads to the collection chamber 36. An oil leakage conduit 48 also connects the spring chamber 39 to a connection 49.

Figure 6:
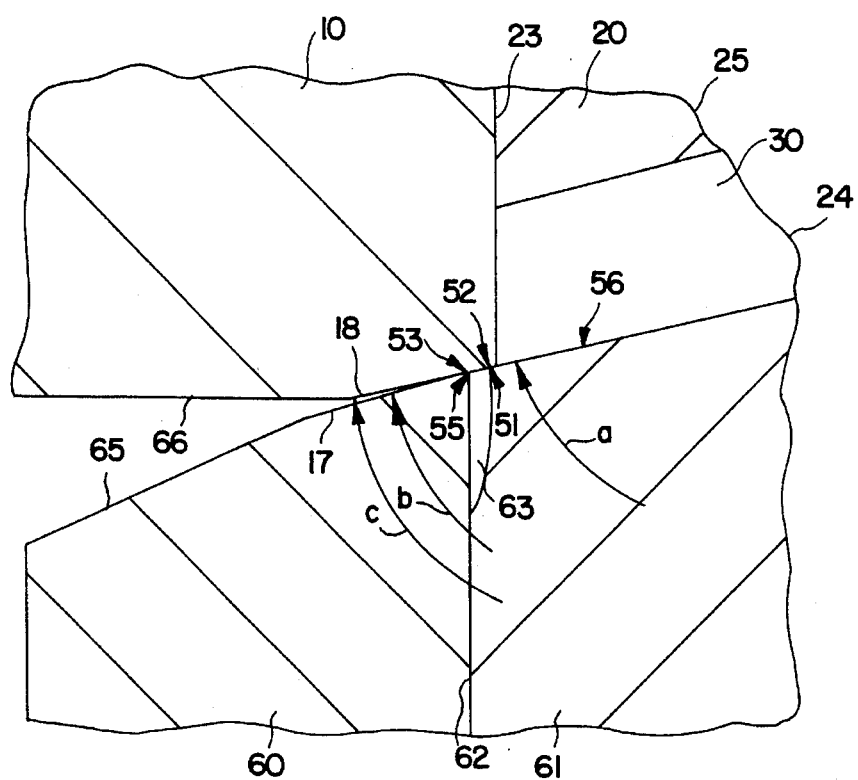

In order to adapt the alignment of the injection holes 30 in the piston slide 20 to the combustion chamber, they are inclined to the longitudinal axis of the valve needle 15, for example at a conical angle a of 150°. They begin at the bottom 24 of the recess 25 in the piston slide 20 and discharge with their opening cross section in the circumference of the outer jacket of the piston slide 20, which is guided in the guide part 23 of the cylinder bore 22. The edge that defines the opening cross section of each of the injection bores 30 is embodied as sharp, particularly the part immediately adjacent the valve cone 17, which part forms a control edge 51 for the injection onset (FIG. 6). To enable the embodiment of the control edge 51 of the piston slide 20 as a sharp edge, the cylindrical circumferential face of the piston slide 20 extends axially beyond the control edge 51. In the closing position (FIG. 6) of the valve needle 15, this control edge 51 of the piston slide 20 is adjacent to an annular control edge 52 of the nozzle body 10; this edge forms the transition between the cylindrical face of the guide part 23 and the conical face of the valve seat 18 and is likewise embodied as sharp, so that when the control edges 51 and 52 of the nozzle body and the valve needle 15 are at the same height, it is possible to seal off the injection ports 30 without any overlap.

The sealing formed by the control edges 51 and 52 serves to initiate the injection onset in a defined way. The actual sealing is formed by the valve seat 18 on the nozzle body 10 and by the valve cone 17 on the nozzle needle 15, specifically in the form of an annular sealing seat line 53. To further reduce the influence of counterpressure, it would be ideal if the diameter of the sealing seat line 53 were equal to that of the piston slide 20. However, in the course of operation, from constant impacts, such an embodiment would lead to deformation of the control edges 51 and 52 of the valve needle 15 and nozzle body 10. For that reason, the diameter of the sealing seat line 53 is slightly greater, for instance by equal to or less than 0.01 mm, than the diameter of the control edge 52 of the nozzle body 10.

The sealing seat line 53 is formed by the contact of a sharp annular edge 55 with the radially inner boundary of the frustoconical valve cone 17 of the valve needle 15. In order that simultaneously with the stroke onset of the valve needle 15 without an idle stroke the injection cross section of the injection ports 30 will likewise be opened by the two control edges 51 and 52, the sealing seat line 53 is located on the extension of the jacket line 56 of the injection ports 30 that intersects the control edge 51. Moreover, the cone angle b of the valve cone 17 and the cone angle c of the valve seat 18 in the extension angle a is adapted to the injection ports 30, or their jacket line 56 that intersects the control edge 51, but the cone angle b of the valve cone 17 is embodied as smaller by from 2° to 10° than the angle c, preferably by 3°, and the cone angle c of the valve seat 18 as larger by a few degrees, for instance about 3°, than the cone angle a by which the injection ports 30, or their jacket lines 56 that intersect the control edge 51, extend.

The above-described valve seat embodiment is achieved by embodying the valve needle 15 in two parts, the piston slide 20 having the injection ports 30 is integral with the shaft 14 of the valve needle 15, and the valve cone 17 is disposed on an annular body 60 that is secured to a continuation 61 of the piston slide 20 on the end toward the combustion chamber of the valve needle 15.

The valve cone 17 is formed on the face end of the annular body 60 toward the valve seat 18, and its inner annular edge 55 is bounded by the jacket face of the inner bore 62. In order to form the aforementioned spacing of the sealing seat line 53, formed by the annular edge 55, on the control edge 52 of the nozzle body 10, the diameter of the inner bore 62 of the annular body 60 is greater, by the amount recited above, than the diameter of the piston slide 20. The diameter of the continuation 61 of the piston slide 20 is correspondingly greater as well. So that the control edge 51 will be embodied as sharp, the annular body 60 protrudes beyond the continuation 62, so that in this region a gap 63 is formed, which is hydraulically insignificant since it is not aligned with the injection cross section of the stream emerging from the injection port 30. The frustoconical valve cone 17 and the hollow frustoconical valve seat 18 are embodied as very narrow, less than 1 mm wide; the faces 65, 66 radially outwardly adjoining them are sharply inclined, so as not to affect the injection streams.

Figure 2:
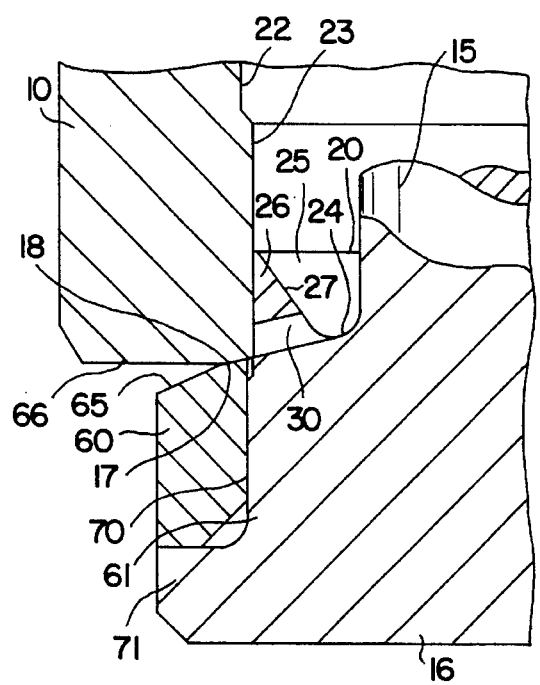
Figure 3:
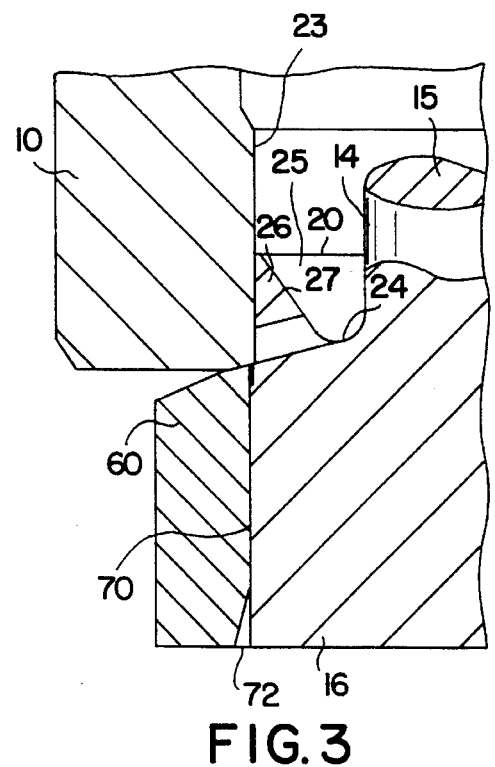

The annular body 60 may be secured to the valve needle 15 in various ways. It is slipped on to the extension 61 of the valve needle 15 and retained there positively and/or non-positively. In the exemplary embodiment of FIG. 2, the annular body 60 is held by means of a press fit 70 and secured by a collar 71 on the end of the valve needle 15. The annular body 60 of the exemplary embodiment of FIG. 3 likewise sits with a press fit 70 on the continuation 61 and is secured by a weld seam 72 on the end toward the combustion chamber.

Figure 4:
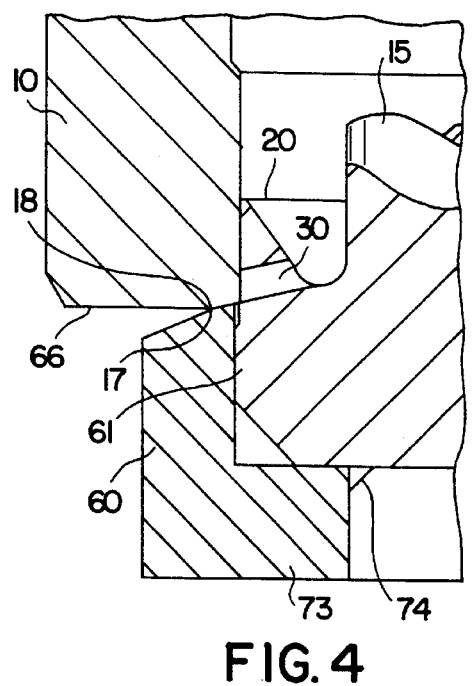
Figure 5:
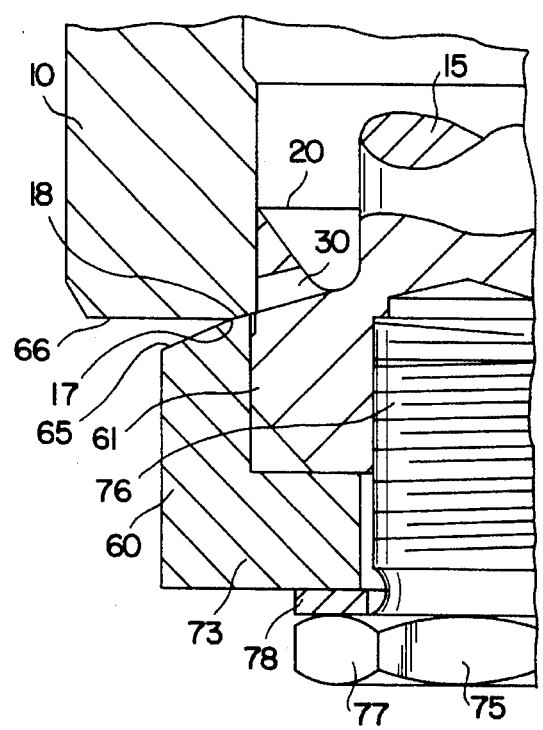

In the exemplary embodiments of FIGS. 4 and 5, the annular body 60 has an inner collar 73, which fits over the face end toward the combustion chamber of the valve needle 17. A weld seam 74 on the inside of the collar 73 joins the annular body 60 to the face end of the valve needle 15 (FIG. 4). The securing of the annular body 60 may also be done with a cap screw 75, whose shaft 76 engages a threaded bore in the continuation 71, and whose cap 77 fits over the collar 73 of the annular body 60, with the interposition of a shim 78. In principle, laser welding, electron beam welding, pressing and shrink fitting are possible connecting techniques for securing the annular body 60 to the valve needle 15.

The injection nozzle described functions as follows:

In the intervals between injections, the closing spring 40 presses the valve needle 15 with the valve cone 17 of the valve needle 15 against the valve seat 18 on the nozzle body 10; the discharge orifice of the injection ports 30 is covered by the surrounding wall of the nozzle body 10 in the guide part 23, and the sealing cone 17 rests tightly against the valve seat 18. When fuel is supplied under pressure through the inflow conduit 47 into the collecting chamber 36 and from there through the annular gap 37 into the pressure chamber 21, a pressure builds up in the pressure chamber that acts upon the piston slide 20 of the closing head 16. When a certain opening pressure is reached, at which the initial stress of the closing spring 40 is overcome, the valve needle 15 is displaced in the flow direction. The valve cone 17 with the annular edge 55 lifts from the valve seat 18 of the nozzle body 10, and the control edge 51 of the injection ports 30 moves away from the control edge 52 of the nozzle body 10, and controlled as a function of feed pressure of the fuel, a defined injection cross section of the invention ports 33 is uncovered. The needle stroke and injection cross section each results from the equilibrium between the force of the closing spring 40 and the hydraulic force at the piston 20. Through the injection cross section being uncovered at the discharge orifice of the injection ports 30, fuel in the form of focused injection streams flows between the valve cone 17 and the valve seat 18 into the engine combustion chamber at a predetermined cone angle, as it does in conventional multi-port nozzles. Various cross-sectional opening courses are imposed on the injection nozzle by the form of the cross section of the injection ports 30, as a rectangle, triangle, oval, or other closed curved courses. In this way, preferably in combination with the characteristic of the closing spring 40 and the pump rate of the injection pump, the course of injection over time can be influenced for attaining optimal engine combustion. Because of the aforementioned equilibrium condition, the optimal injection cross section for fuel preparation at any given time is always established.

This injection cross section is always the narrowest point in the hydraulic system, and so no seat throttling can occur.

When the pressure of the pumped fuel decreases, the closing spring 40 pulls the valve needle 15 back again; initially, the injection ports 30 are closed, and then the valve cone 17 of the closing head 16 tightly closes off the valve seat 18 again.

The foregoing relates to preferred exemplary embodiments of the invention, it being understood that other variants and embodiments thereof are possible within the spirit and scope of the invention, the latter being defined by the appended claims.

We claim:

1. A fuel injection nozzle for internal combustion engines, having a combustion chamber with direct injection, having a nozzle body (10), in which an axial through bore with a guide part (23) and, on an end toward the combustion chamber, a frustoconical valve seat (18) are formed, the annular edge between the guide parts (23) of the through bore and the valve seat forming a control edge (52), having a spring-loaded outward-opening valve needle (15) that is displaceable with a piston-slidelike guide portion (20) in the guide part (23) of the nozzle body, which needle on an end protruding past the valve seat (18) has a closing head (16) with a valve cone (17), whose seat face axially coincides with the valve seat (18), wherein the cone angle (16) of the seat face of the valve cone (17) differs slightly from that (c) of the valve seat (18) so that an annular sealing seat line (53) is formed, and which piston-slidelike guide portion (20) of the valve needle (15) is covered by the guide part (23) of the nozzle body and has injection ports (30) that can be opened as a function of the needle stroke by the control edge (52) of the nozzle body in the opening stroke, relative to the extension of which ports the inclination of the valve cone (17) is aligned, the control edge (52) at a transition of the valve seat (18) to the cylindrical guide part (23) of the nozzle body (10) is embodied as sharp-edged; that the cone angle (c) of the valve seat (18) on the nozzle body is slightly greater than the cone angle (b) of the valve cone (17) on the valve needle (15); and that the radially inner boundary of the valve face of the valve cone (17) is embodied as a sharp annular edge (55), whose diameter is slightly greater than the diameter of the control edge (51) of the nozzle body (10), so that an annular sealing seat line (53) is formed immediately next to the control edge (51).

2. A fuel injection nozzle as defined by claim 1, in which the valve cone (17) is formed on an annular body (60) that is secured to the closing head (16) of the valve needle (15).

3. A fuel injection nozzle as defined by claim 2, in which the annular body (60) is mounted on a cylindrical extension (62) of the guide portion (20) of the valve needle (15), the diameter of which continuation is slightly greater than the diameter of the guide portion (20) of the valve needle (15).

4. A fuel injection nozzle as defined by claim 3, in which the annular body (60) is secured nonpositively to the nozzle needle (15).

5. A fuel injection nozzle as defined by claim 3, in which the annular body (60) is secured positively to the nozzle needle (15).

6. A fuel injection nozzle as defined by claim 1, in which the cone angle (c) of the valve seat (18) on the nozzle body (10) is greater by 2° to 10° than the cone angle (b) of the valve cone (17) of the nozzle needle (15).

7. A fuel injection nozzle as defined by claim 2, in which the cone angle (c) of the valve seat (18) on the nozzle body (10) is greater by 2° to 10° than the cone angle (b) of the valve cone (17) of the nozzle needle (15).

8. A fuel injection nozzle as defined by claim 3, in which the cone angle (c) of the valve seat (18) on the nozzle body (10) is greater by 2° to 10° than the cone angle (b) of the valve cone (17) of the nozzle needle (15).

9. A fuel injection nozzle as defined by claim 4, in which the cone angle (c) of the valve seat (18) on the nozzle body (10) is greater by 2° to 10° than the cone angle (b) of the valve cone (17) of the nozzle needle (15).

10. A fuel injection nozzle as defined by claim 5, in which the cone angle (c) of the valve seat (18) on the nozzle body (10) is greater by 2° to 10° than the cone angle (b) of the valve cone (17) of the nozzle needle (15).

11. A fuel injection nozzle as defined by claim 1, in which said cone angle (c) of the valve seat (18) is larger by about 3° than the cone angle (a).

12. A fuel injection nozzle as defined by claim 2, in which said cone angle (c) of the valve seat (18) is larger by about 3° than the cone angle (a).

13. A fuel injection nozzle as defined by claim 3, in which said cone angle (c) of the valve seat (18) is larger by about 3° than the cone angle (a).

14. A fuel injection nozzle as defined by claim 4, in which said cone angle (c) of the valve seat (18) is larger by about 3° than the cone angle (a).

15. A fuel injection nozzle as defined by claim 5, in which said cone angle (c) of the valve seat (18) is larger by about 3° than the cone angle (a).

16. A fuel injection nozzle as defined by claim 6, in which said cone angle (c) of the valve seat (18) is larger by about 3° than the cone angle (a).

* * * * *